(12) United States Patent
Stevenson et al.

(10) Patent No.: US 7,906,470 B2
(45) Date of Patent: Mar. 15, 2011

(54) QUATERNARY AMMONIUM SALT OF A MANNICH COMPOUND

(75) Inventors: Paul R. Stevenson, Belper (GB); Dean Thetford, Blackley (GB); Jonathan S. Vilardo, Chardon, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 831 days.

(21) Appl. No.: 11/469,690

(22) Filed: Sep. 1, 2006

(65) Prior Publication Data

US 2008/0052985 A1    Mar. 6, 2008

(51) Int. Cl.
*C10M 159/16* (2006.01)
*C10L 1/22* (2006.01)

(52) U.S. Cl. ........ 508/542; 508/375; 508/544; 508/547; 44/415

(58) Field of Classification Search .......... 44/415; 508/542, 544, 545, 547
See application file for complete search history.

(56) References Cited

U.S. PATENT DOCUMENTS

| | | | |
|---|---|---|---|
| 3,401,119 A | 9/1968 | Froelich | |
| 3,468,816 A | 9/1969 | Thompson et al. | |
| 3,749,695 A | 7/1973 | de Vries | |
| 3,778,371 A | 12/1973 | Malec | 252/34 |
| 4,056,531 A | 11/1977 | Malec | 260/268 PL |
| 4,071,327 A * | 1/1978 | Dorer, Jr. | 44/398 |
| 4,108,858 A | 8/1978 | Malec | 260/294.8 E |
| 4,171,959 A | 10/1979 | Vartanian | 44/63 |
| 4,179,424 A | 12/1979 | Phillips et al. | 260/29.4 UA |
| 4,253,980 A | 3/1981 | Hammond et al. | 252/34 |
| 4,306,070 A | 12/1981 | Hammond et al. | 546/283 |
| 4,326,973 A | 4/1982 | Hammond et al. | 252/34 |
| 4,338,206 A | 7/1982 | Hammond et al. | 252/34 |
| 5,000,792 A | 3/1991 | Ohta et al. | 106/499 |
| 5,254,138 A | 10/1993 | Kurek | 44/347 |
| 5,279,626 A | 1/1994 | Cunningham et al. | |
| 5,697,988 A | 12/1997 | Malfer et al. | 44/415 |
| 5,721,358 A | 2/1998 | Hikosaka et al. | 540/144 |
| 5,725,612 A | 3/1998 | Malfer et al. | 44/415 |
| 5,833,722 A | 11/1998 | Davies et al. | |
| 5,876,468 A | 3/1999 | Moreton | 44/415 |
| 5,944,858 A * | 8/1999 | Wallace | 44/359 |
| 6,403,725 B1 | 6/2002 | Huang et al. | |
| 7,435,845 B2 | 10/2008 | Dahlmann et al. | |
| 2003/0213410 A1 | 11/2003 | Adams et al. | 106/499 |
| 2005/0107266 A1* | 5/2005 | Wollenberg et al. | 508/222 |
| 2005/0130856 A1* | 6/2005 | Svarcas et al. | 508/454 |
| 2005/0172543 A1* | 8/2005 | Muir | 44/314 |

FOREIGN PATENT DOCUMENTS

| | | |
|---|---|---|
| GB | 1373660 | 11/1974 |
| WO | 2004065430 | 8/2004 |

OTHER PUBLICATIONS

Corresponding International Publication No. 2008/027881 A3 published May 29, 2008.

* cited by examiner

*Primary Examiner* — Ellen M McAvoy
*Assistant Examiner* — Taiwo Oladapo
(74) *Attorney, Agent, or Firm* — Christopher D. Hilker; David M. Shold

(57) ABSTRACT

A quaternary ammonium salt detergent made from the reaction product of the reaction of: (a) Mannich reaction product having a tertiary amino group, said Mannich reaction product being prepared from the reaction of a hydrocarbyl-substituted phenol, an aldehyde, and amine; and (b) a quaternizing agent suitable for converting the tertiary amino group to a quaternary nitrogen and the use of such quaternary ammonium salt detergents in a fuel composition to reduce intake valve deposits.

10 Claims, No Drawings

QUATERNARY AMMONIUM SALT OF A MANNICH COMPOUND

BACKGROUND OF THE INVENTION

The composition of the present invention relates to a quaternary ammonium salt detergent and the use of such quaternary ammonium salt detergents in a fuel composition to reduce intake valve deposits and remove or clean up existing deposits on the intake valves; and the use of the quaternary ammonium salt in media such as inks, coatings, mill-bases, plastics and paints. For this application the terms detergent and dispersant can be used interchangeable and have the same meaning.

It is well known that liquid fuel contains components that can degrade during engine operation and form deposits. These deposits can lead to incomplete combustion of the fuel resulting in higher emission and poorer fuel economy. Fuel additives, such as detergents, are well known additives in liquid fuels to help with control or minimize deposit formation. As the dynamics and mechanics of an engine continual advance, the requirements of the fuel must evolve to keep up with these engine advancements. For example, today's engines have injector system that have smaller tolerances and operate at higher pressure to enhance fuel spray to the compression or combustion chamber. Deposit prevention and deposit reduction in these new engines has become critical to optimal operation of today's engines. Advancements in fuel additive technology, such as detergents, have enabled the fuel to keep up with these engine advancements. Therefore, there is a need for detergent capable of providing acceptable performance in a liquid fuel to promote optimal operation of today's engines.

U.S. Pat. No. 5,000,792 discloses polyesteramine detergent obtainable by reacting 2 parts of polyhydroxycarboxylic acids with 1 part of dialkylenetriamine.

U.S. Pat. No. 4,171,959 discloses a motor fuel composition containing quaternary ammonium salts of a succinimide. The quaternary ammonium salt has a counterion of a halide, a sulphonate or a carboxylate.

U.S. Pat. No. 4,338,206 and U.S. Pat. No. 4,326,973 discloses fuel compositions containing a quaternary ammonium salt of a succinimide, wherein the ammonium ion is heterocyclic aromatic (pyridinium ion).

U.S. Pat. No. 4,108,858 discloses a fuel or lubricating oil composition containing a C2 to C4 polyolefin with a Mw of 800 to 1400 salted with a pyridinium salt.

U.S. Pat. No. 5,254,138 discloses a fuel composition containing a reaction product of a polyalkyl succinic anhydride with a polyamino hydroxyalkyl quaternary ammonium salt.

U.S. Pat. No. 4,056,531 discloses a lubricating oil or fuel containing a quaternary ammonium salt of a hydrocarbon with a Mw of 350 to 3000 bonded to triethylenediamine. The quaternary ammonium salt counterion is selected from halides, phosphates, alkylphosphates, dialkylphosphates, borates, alkylborates, nitrites, nitrates, carbonates, bicarbonates, alkanoates, and O,O-dialkyldihtiophosphates.

U.S. Pat. No. 4,253,980 and U.S. Pat. No. 4,306,070 disclose a fuel composition containing a quaternary ammonium salt of an ester-lactone.

U.S. Pat. No. 3,778,371 discloses a lubricating oil or fuel containing a quaternary ammonium salt of a hydrocarbon with a Mw of 350 to 3000; and the remaining groups to the quaternary nitrogen are selected from the group of C1 to C20 alkyl, C2 to C8 hydroxyalkyl, C2 to C20 alkenyl or cyclic groups.

The present invention, therefore, promotes optimal engine operation, that is, increased fuel economy, better vehicle drivability, reduced emissions and less engine maintenance by reducing, minimizing and controlling deposit formation.

Many formulations such as inks, paints, mill-bases and plastics materials require effective dispersants for uniformly distributing a particulate solid in an organic medium. The organic medium may vary from a polar to non-polar organic medium. Dispersants containing terminal basic groups such as poly(lower alkylene)imine chains are well known and are generally prepared by reaction of the polyimine with polyester chains containing terminal acid groups, the reaction results in a mixture of amide and salt forms. However, many of these dispersants have limited performance towards viscosity and stability properties, which when incorporated into printing inks or paints give the inks and paints with poor flow characteristics. Therefore, there is a need for a dispersant capable of providing acceptable flow characteristics and having stability properties.

U.S. Pat. No. 5,721,358 which discloses a process for copper phthalocyanine production using a dispersant derived from a non-salted succinimide dispersant. The succinimide dispersant is derived from an alkyleneamine and polyisobutylene succinic anhydride.

US Application 2003/0213410 discloses a polymer-modified pigment comprising a polymer with at least one carboxylic group or salt thereof and at least one coupling agent. The polymer includes derivatives of polyamines that have been reacted with an acylating agent such as acetic or succinic anhydride.

GB 1,373,660 discloses polyesteramine dispersants obtainable by reaction of polyhydroxycarboxylic acids with diamines especially alkylenediamines and their salts thereof.

Therefore, it would be advantageous to have a dispersant with acceptable performance, which when incorporated into inks, coatings, mill-bases, plastics and paints gives the inks, coatings, mill-bases, plastics or paints acceptable flow characteristics.

SUMMARY OF THE INVENTION

The present invention provides a composition comprising a quaternary ammonium salt which comprises the reaction product of:

a. Mannich reaction product having a tertiary amino group, said Mannich reaction product being prepared from the reaction of a hydrocarbyl-substituted phenol, an aldehyde, and an amine; and b. quaternizing agent suitable for converting the tertiary amino group to a quaternary nitrogen.

The present invention further provides a method for fueling an internal combustion engine, comprising:

A. supplying to said engine:

i. a fuel which is liquid at room temperature; and ii. quaternary ammonium salt comprising the reaction product of:

a. Mannich reaction product having a tertiary amino group, said Mannich reaction product being prepared from the reaction of a hydrocarbyl-substituted phenol, an aldehyde, and an amine; and b. a quaternizing agent suitable for converting the tertiary amino group to a quaternary nitrogen.

The present invention additionally provides a method of lubricating an internal combustion engine comprising:

A. supplying to the crankcase of said engine:
  i. an oil of lubricating viscosity; and
  ii. quaternary ammonium salt comprising the reaction product of:
    a. Mannich reaction product having a tertiary amino group, said Mannich reaction product being prepared from the reaction of a hydrocarbyl-substituted phenol, an aldehyde, and amine; and
    b. a quaternizing agent suitable for converting the tertiary amino group to a quaternary nitrogen.

The present invention further provides a composition comprising: (i) a particulate solid; (ii) an organic medium; and (iii) a quaternary ammonium salt which comprises the reaction product of:
  a. Mannich reaction product having a tertiary amino group, said Mannich reaction product being prepared from the reaction of a hydrocarbyl-substituted phenol, an aldehyde, and an amine; and
  b. quaternizing agent suitable for converting the tertiary amino group to a quaternary nitrogen.

The present invention further provides a paint or ink composition comprising a particulate solid, an organic liquid, a binder and a quaternary ammonium salt which comprises the reaction product of:
  a. Mannich reaction product having a tertiary amino group, said Mannich reaction product being prepared from the reaction of a hydrocarbyl-substituted phenol, an aldehyde, and an amine; and
  b. quaternizing agent suitable for converting the tertiary amino group to a quaternary nitrogen.

The present invention further provides a mill-base comprising a particulate solid, an organic liquid and a quaternary ammonium salt which comprises the reaction product of:
  a. Mannich reaction product having a tertiary amino group, said Mannich reaction product being prepared from the reaction of a hydrocarbyl-substituted phenol, an aldehyde, and an amine; and
  b. quaternizing agent suitable for converting the tertiary amino group to a quaternary nitrogen.

DETAILED DESCRIPTION OF THE INVENTION

Various preferred features and embodiments will be described below by way of non-limiting illustration.

Field of the Invention

This invention involves a quaternary ammonium salt, a fuel composition that includes the quaternary ammonium salt, and a method of operating an internal combustion engine with the fuel composition. The compositions and methods of the present invention minimize, reduce and control deposit formation in the engine, which reduces fuel consumption, promotes drivability, vehicle maintenance, and reduces emissions which enables optimal engine operation.

Fuel

The composition of the present invention can comprise a fuel which is liquid at room temperature and is useful in fueling an engine. The fuel is normally a liquid at ambient conditions e.g., room temperature (20 to 30° C.). The fuel can be a hydrocarbon fuel, a nonhydrocarbon fuel, or a mixture thereof. The hydrocarbon fuel can be a petroleum distillate to include a gasoline as defined by ASTM specification D4814 or a diesel fuel as defined by ASTM specification D975. In an embodiment of the invention the fuel is a gasoline, and in other embodiments the fuel is a leaded gasoline, or a non-leaded gasoline. In another embodiment of this invention the fuel is a diesel fuel. The hydrocarbon fuel can be a hydrocarbon prepared by a gas to liquid process to include for example hydrocarbons prepared by a process such as the Fischer-Tropsch process. The nonhydrocarbon fuel can be an oxygen containing composition, often referred to as an oxygenate, to include an alcohol, an ether, a ketone, an ester of a carboxylic acid, a nitroalkane, or a mixture thereof. The nonhydrocarbon fuel can include, for example, methanol, ethanol, methyl t-butyl ether, methyl ethyl ketone, transesterified oils and/or fats from plants and animals such as rapeseed methyl ester and soybean methyl ester, and nitromethane. In several embodiments of this invention the fuel can have an oxygenate content on a weight basis that is 1 percent by weight, or 10 percent by weight, or 50 percent by weight, or up to 85 percent by weight. Mixtures of hydrocarbon and nonhydrocarbon fuels can include, for example, gasoline and methanol and/or ethanol, diesel fuel and ethanol, and diesel fuel and a transesterified plant oil such as rapeseed methyl ester. In an embodiment of the invention, the liquid fuel can be an emulsion of water in a hydrocarbon fuel, a nonhydrocarbon fuel, or a mixture thereof. In several embodiments of this invention the fuel can have a sulfur content on a weight basis that is 5000 ppm or less, 1000 ppm or less, 300 ppm or less, 200 ppm or less, 30 ppm or less, or 10 ppm or less. In another embodiment, the fuel can have a sulfur content on a weight basis of 1 to 100 ppm. In one embodiment, the fuel contains 0 ppm to 1000 ppm, or 0 to 500 ppm, or 0 to 100 ppm, or 0 to 50 ppm, or 0 to 25 ppm, or 0 to 10 ppm, or 0 to 5 ppm of alkali metals, alkaline earth metals, transition metals or mixtures thereof. In another embodiment, the fuel contains 1 to 10 ppm by weight of alkali metals, alkaline earth metals, transition metals or mixtures thereof. It is well known in the art that a fuel containing alkali metals, alkaline earth metals, transition metals or mixtures thereof have a greater tendency to form deposits and therefore foul or plug injectors. The fuel of the invention can be present in a fuel composition in a major amount that is generally greater than 50 percent by weight, and in other embodiments is present at greater than 90 percent by weight, greater than 95 percent by weight, greater than 99.5 percent by weight, or greater than 99.8 percent by weight.

Quaternary Ammonium Salt

The composition of the present invention comprises an quaternary ammonium salt which comprises the reaction product of: (a) Mannich reaction product having a tertiary amino group, said Mannich reaction product being prepared from the reaction of a hydrocarbyl-substituted phenol, an aldehyde, and an amine; and (b) a quaternizing agent suitable for converting the tertiary amino group to a quaternary nitrogen wherein the quaternizing agent is selected from the group consisting of dialkyl sulfates, alkyl halides, hydrocarbyl substituted carbonates; hydrocarbyl epoxides in combination with an acid or mixtures thereof.

Examples of quaternary ammonium salt and methods for preparing the same are described in the following patents, which are hereby incorporated by reference, U.S. Pat. No. 4,253,980, U.S. Pat. No. 3,778,371, U.S. Pat. No. 4,171,959, U.S. Pat. No. 4,326,973, U.S. Pat. No. 4,338,206, and U.S. Pat. No. 5,254,138.

Mannich Reaction Product

The Mannich reaction product the present invention has a tertiary amino group and is prepared from the reaction product of a hydrocarbyl-substituted phenol, an aldehyde, and an amine.

The hydrocarbyl substituent of the hydrocarbyl-substituted phenol can have 10 to 400 carbon atoms, in another instance 30 to 180 carbon atoms, and in a further instance 10 or 40 to 110 carbon atoms. This hydrocarbyl substituent can be derived from an olefin or a polyolefin. Useful olefins include alpha-olefins, such as 1-decene, which are commercially available.

The polyolefins which can form the hydrocarbyl substituent can be prepared by polymerizing olefin monomers by well known polymerization methods and are also commercially available. The olefin monomers include monoolefins, including monoolefins having 2 to 10 carbon atoms such as ethylene, propylene, 1-butene, isobutylene, and 1-decene. An especially useful monoolefin source is a $C_4$ refinery stream having a 35 to 75 weight percent butene content and a 30 to 60 weight percent isobutene content. Useful olefin monomers also include diolefins such as isoprene and 1,3-butadiene. Olefin monomers can also include mixtures of two or more monoolefins, of two or more diolefins, or of one or more monoolefins and one or more diolefins. Useful polyolefins include polyisobutylenes having a number average molecular weight of 400 to 3000, in another instance of 400 to 2500, and in a further instance of 400 or 500 to 1500. The polyisobutylene can have a vinylidene double bond content of 5 to 69 percent, in a second instance of 50 to 69 percent, and in a third instance of 50 to 95 percent. The polyolefin can be a homopolymer prepared from a single olefin monomer or a copolymer prepared from a mixture of two or more olefin monomers. Also possible as the hydrocarbyl substituent source, are mixtures of two or more homopolymers, two or more copolymers, or one or more homopolymers and one or more copolymers.

The hydrocarbyl-substituted phenol can be prepared by alkylating phenol with an olefin or polyolefin described above, such as, a polyisobutylene or polypropylene, using well-known alkylation methods.

The aldehyde used to form the Mannich detergent can have 1 to 10 carbon atoms, and is generally formaldehyde or a reactive equivalent thereof such as formalin or paraformaldehyde.

The amine used to form the Mannich detergent can be a monoamine or a polyamine. In either case they will be characterized by the formula $R^4R^5NH$ wherein $R^4$ and $R^5$ are each independently hydrogen, hydrocarbon, amino-substituted hydrocarbon, hydroxy-substituted hydrocarbon, alkoxy-substituted hydrocarbon, or acylimidoyl groups provided that no more than one of $R^4$ and $R^5$ is hydrogen. In all cases, therefore, they will be characterized by the presence within their structure of at least one H—N<group. Therefore, they have at least one primary (i.e., $H_2N$—) or secondary amino (i.e., H—N<) group. Examples of monoamines include ethylamine, dimethylamine, diethylamine, n-butylamine, dibutylamine, allylamine, isobutylamine, cocoamine, stearylamine, laurylamine, methyllaurylamine, oleylamine, N-methyl-octylamine, dodecylamine, diethanolamine, morpholine, and octadecylamine.

The polyamines from which the detergent is derived include principally alkylene amines conforming, for the most part, to the formula

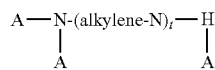

wherein t is an integer typically less than 10, A is hydrogen or a hydrocarbyl group typically having up to 30 carbon atoms, and the alkylene group is typically an alkylene group having less than 8 carbon atoms. The alkylene amines include principally, ethylene amines, hexylene amines, heptylene amines, octylene amines, other polymethylene amines. They are exemplified specifically by: ethylenediamine, diethylenetriamine, triethylene tetramine, propylene diamine, decamethylene diamine, octamethylene diamine, di(heptamethylene) triamine, tripropylene tetramine, tetraethylene pentamine, trimethylene diamine, pentaethylene hexamine, di(-trimethylene) triamine, aminopropylmorpholine and dimethylaminopropylamine. Higher homologues such as are obtained by condensing two or more of the above-illustrated alkylene amines likewise are useful. Tetraethylene pentamine is particularly useful.

The ethylene amines, also referred to as polyethylene polyamines, are especially useful. They are described in some detail under the heading "Ethylene Amines" in Encyclopedia of Chemical Technology, Kirk and Othmer, Vol. 5, pp. 898-905, Interscience Publishers, New York (1950).

In one embodiment, the Mannich detergent can be prepared by reacting a hydrocarbyl-substituted phenol, an aldehyde, and an amine as described in U.S. Pat. No. 5,697,988. In one embodiment, the Mannich reaction product can be prepared from an alkylphenol derived from a polyisobutylene, formaldehyde, and an amine that is a primary monoamine, a secondary monoamine, or an alkylenediamine, in particular, ethylenediamine or dimethylamine.

In another embodiment, the Mannich reaction product of the present invention can be prepared by reacting the alkyl-substituted hydroxyaromatic compound, aldehyde and polyamine by well known methods including the method described in U.S. Pat. No. 5,876,468.

In yet another embodiment, the Mannich reaction product can be prepared by well known methods generally involving reacting the hydrocarbyl substituted hydroxy aromatic compound, an aldehyde and an amine at temperatures between 50 to 200° C. in the presence of a solvent or diluent while removing reaction water as described in U.S. Pat. No. 5,876,468.

It may be necessary with some of the amines to further react the Mannich reaction product with an epoxide or carbonate or other alkylating agents to get the tertiary amino group.

Quaternizing Agent

The composition of the present invention contains a quaternizing agent suitable for converting the tertiary amino group to a quaternary nitrogen wherein the quaternizing agent is selected from the group consisting of dialkyl sulfates, alkyl halides, hydrocarbyl substituted carbonates; hydrocarbyl epoxides in combination with an acid and mixtures thereof.

In one embodiment, the quaternizing agent can include: halides, such as chloride, iodide or bromide; hydroxides; sulphonates; alkyl sulphates, such as, dimethyl sulfate; sultones; phosphates; $C_{1-12}$ alkylphosphates; di $C_{1-12}$ alkylphosphates; borates; $C_{1-12}$ alkylborates; nitrites; nitrates; carbonates; bicarbonates; alkanoates; O,O-di $C_{1-12}$ alkyldithiophosphates; or mixtures thereof.

In one embodiment, the quaternizing agent may be derived from dialkyl sulphates such as dimethyl sulfate, N-oxides, sultones such as propane and butane sultone; alkyl, or arylalkyl halides such as methyl and ethyl chloride, bromide or iodide or benzyl chloride, and a hydrocarbyl (or alkyl) substituted carbonates. If the alkyl halide is benzyl chloride, the aromatic ring is optionally further substituted with alkyl or alkenyl groups.

The hydrocarbyl (or alkyl) groups of the hydrocarbyl substituted carbonates may contain 1 to 50, 1 to 20, 1 to 10 or 1 to 5 carbon atoms per group. In one embodiment, the hydrocarbyl substituted carbonates contain two hydrocarbyl groups that may be the same or different. Examples of suitable hydrocarbyl substituted carbonates include dimethyl or diethyl carbonate.

In another embodiment, the quaternizing agent can be a hydrocarbyl epoxides, as represented by the following formula, in combination with an acid:

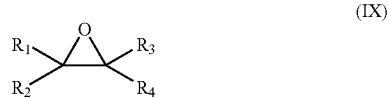

wherein $R_1$, $R_2$, $R_3$ and $R_s$ can be independently H or a $C_{1-50}$ hydrocarbyl group.

Examples of hydrocarbyl epoxides can include: styrene oxide, ethylene oxide, propylene oxide, butylene oxide, stilbene oxide and $C_{2-50}$ epoxide.

Fluidizer

The composition of the present invention can additionally contain a fluidizer.

In one embodiment, the fluidizer can be a polyetheramines, which can be represented by the formula $R[OCH_2CH(R^1)]_nA$, where R is a hydrocarbyl group, $R^1$ is selected from the group consisting of hydrogen, hydrocarbyl groups of 1 to 16 carbon atoms, and mixtures thereof, n is a number from 2 to about 50, and A is selected from the group consisting of —$OCH_2CH_2CH_2NR^2R^2$ and —$NR^3R^3$, where each $R^2$ is independently hydrogen or hydrocarbyl, and each $R^3$ is independently hydrogen, hydrocarbyl or —$[R^4N(R^5)]_pR^6$, where $R^4$ is $C_2$-$C_{10}$ alkylene, $R^5$ and $R^6$ are independently hydrogen or hydrocarbyl, and p is a number from 1-7. These polyetheramines can be prepared by initially condensing an alcohol or alkylphenol with an alkylene oxide, mixture of alkylene oxides or with several alkylene oxides in sequential fashion in a 1:2-50 mole ratio of hydric compound to alkylene oxide to form a polyether intermediate. U.S. Pat. No. 5,094,667 provides reaction conditions for preparing a polyether intermediate, the disclosure of which is incorporated herein by reference. In one embodiment, the alcohols can be linear or branched from 1 to 30 carbon atoms, in another embodiment 6 to 20 carbon atoms, in yet another embodiment from 10 to 16 carbon atoms. The alkyl group of the alkylphenols can be 1 to 30 carbon atoms, in another embodiment 10 to 20 carbon atoms. Examples of the alkylene oxides include ethylene oxide, propylene oxide or butylene oxide. The number of alkylene oxide units in the polyether intermediate can be 10-35 or 18-27. The polyether intermediate can be converted to a polyetheramine by amination with ammonia, an amine or a polyamine to form a polyetheramine of the type where A is —$NR^3R^3$. Published Patent Application EP310875 provides reaction conditions for the amination reaction, the disclosure of which is incorporated herein by reference. Alternately, the polyether intermediate can also be converted to a polyetheramine of the type where A is —$OCH_2CH_2CH_2NR^2R^2$ by reaction with acrylonitrile followed by hydrogenation. U.S. Pat. No. 5,094,667 provides reaction conditions for the cyanoethylation and subsequent hydrogenation, the disclosure of which is incorporated herein by reference. Polyetheramines where A is —$OCH_2CH_2CH_2NH_2$ are typically preferred. Commercial examples of polyetheramines are the Techron® range from Chevron and the Jeffamine® range from Huntsman.

In another embodiment, the fluidizer can be a polyether, which can be represented by the formula $R^7O[CH_2CH(R^8)O]_qH$, where $R^7$ is a hydrocarbyl group, $R^8$ is selected from the group consisting of hydrogen, hydrocarbyl groups of 1 to 16 carbon atoms, and mixtures thereof, and q is a number from 2 to about 50. Reaction conditions for preparation as well as various embodiments of the polyethers are presented above in the polyetheramine description for the polyether intermediate. A commercial example of a polyether is the Lyondell ND® series. Other suitable polyethers are also available from Dow Chemicals, Huntsman, and ICI.

In yet another embodiment, the fluidizer can be a hydrocarbyl-terminated poly-(oxyalkylene) aminocarbamate as described U.S. Pat. No. 5,503,644.

In yet another embodiment, the fluidizer can be an alkoxylate, wherein the alkoxylate can comprise: (i) a polyether containing two or more ester terminal groups; (ii) a polyether containing one or more ester groups and one or more terminal ether groups; or (iii) a polyether containing one or more ester groups and one or more terminal amino groups wherein a terminal group is defined as a group located within five connecting carbon or oxygen atoms from the end of the polymer. Connecting is defined as the sum of the connecting carbon and oxygen atoms in the polymer or end group.

An alkoxylate can be represented by the formula:

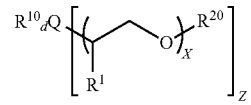

wherein, $R^{10}$ is H, TC(O)—, or a $C_{1-36}$ hydrocarbyl group, wherein T is a $C_{1-36}$ fatty acid hydrocarbyl mixture in tallow fatty acid or a fatty acid free of rosin acid; $R^{20}$ is H, A, WC(O)—, or mixtures thereof, wherein A is selected from the group consisting of —$OCH_2CH_2CH_2NR^2R^2$ and —$NR^3R^3$ where each $R^2$ is independently hydrogen or hydrocarbyl, and each $R^3$ is independently hydrogen, hydrocarbyl or —$[R^4N(R^5)]_pR^6$ where $R^4$ is $C_2$-$C_{10}$ alkylene, $R^5$ and $R^6$ are independently hydrogen or hydrocarbyl, and p is a number from 1-7, W is a $C_{1-36}$ hydrocarbyl group; $R^1$ is selected from the group consisting of hydrogen, hydrocarbyl groups of 1 to 16 carbon atoms; X is an integer from 1 to 36; Z is an integer 1 to 3; Q can be O or N; provided that if Q is N then d can be an integer from 0 to 2 and Z is the integer 3-d; if Q is O then d can be an integer 0 to 1 and Z is the integer 2-d and if Q is O and $R^1$ is $C_{1-36}$ hydrocarbyl group then $R^2$ is WC(O)—.

Examples of the alkoxylate can include: $C_{12-15}$ alcohol initiated polypropyleneoxide (22-24) ether amine, Bayer ACTACLEAR ND21-A™ ($C_{12-15}$ alcohol initiated polypropyleneoxide (22-24) ether-ol), tall oil fatty acid initiated polypropyleneoxide (22-24) ester-ol, butanol initiated polypropyleneoxide (23-25) ether-tallow fatty acid ester, glycerol dioleate initiated polypropyleneoxide (23-25) ether-ol, propylene glycol initiated polypropyleneoxide (33-34) ether tallow fatty acid ester, tallow fatty acid initiated polypropyleneoxide (22-24) ester-ol and $C_{12-15}$ alcohol initiated polypropyleneoxide (22-24) ether tallow fatty acid ester.

These alkoxylates can be made from the reaction of a fatty acid such as tall oil fatty acids (TOFA), that is, the mixture of fatty acids predominately oleic and linoleic and contains residual rosin acids or tallow acid that is, the mixture of fatty acids predominately stearic, palmitic and oleic with an alcohol terminated polyether such as polypropylene glycol in the presence of an acidic catalyst, usually methane sulfonic acid. These alkoxylates can also be made from the reaction of glycerol dioleate and propylene oxide in the presence of catalyst.

Oil of Lubricating Viscosity

The composition of the present invention can contain an oil of lubricating viscosity. The oil of lubricating viscosity includes natural or synthetic oils of lubricating viscosity, oil derived from hydrocracking, hydrogenation, hydrofinishing, unrefined, refined and re-refined oils, or mixtures thereof. In one embodiment, the oil of lubricating viscosity is a carrier fluid for the dispersant and/or other performance additives.

Natural oils include animal oils, vegetable oils, mineral oils or mixtures thereof. Synthetic oils include a hydrocarbon oil, a silicon-based oil, a liquid ester of phosphorus-containing acid. Synthetic oils may be produced by Fischer-Tropsch reactions and typically may be hydroisomerised Fischer-Tropsch hydrocarbons or waxes.

Oils of lubricating viscosity may also be defined as specified in the American Petroleum Institute (API) Base Oil Interchangeability Guidelines. In one embodiment the oil of lubricating viscosity comprises an API Group I, II, III, IV, V or mixtures thereof, and in another embodiment API Group I, II, III or mixtures thereof.

Miscellaneous

The composition optionally comprises one or more additional performance additives. The performance additives can include: metal deactivators, detergents, dispersants, viscosity modifiers, friction modifiers, dispersant viscosity modifiers, extreme pressure agents, antiwear agents, antioxidants, corrosion inhibitors, foam inhibitors, demulsifiers, pour point depressants, seal swelling agents, wax control polymers, scale inhibitors, gas-hydrate inhibitors, and mixtures thereof.

The total combined amount of the additional performance additive compounds present on an oil free basis ranges from 0 wt % to 25 wt % or 0.01 wt % to 20 wt % of the composition. Although, one or more of the other performance additives may be present, it is common for the other performance additives to be present in different amounts relative to each other.

In one embodiment, the composition can be in a concentrate forming amount. If the present invention may be in the form of a concentrate (which may be combined with additional oil to form, in whole or in part, a finished lubricant and/or liquid fuel), the ratio of the additive of the invention and/or other additional performance additives in an oil of lubricating viscosity and/or liquid fuel, to diluent oil is in the range of 80:20 to 10:90 by weight.

Antioxidants include molybdenum dithiocarbamates, sulphurised olefins, hindered phenols, diphenylamines; detergents include neutral or overbased, Newtonian or non-Newtonian, basic salts of alkali, alkaline earth and transition metals with one or more of phenates, sulfurized phenates, sulfonates, carboxylic acids, phosphorus acids, mono- and/or di-thiophosphoric acids, saligenins, an alkylsalicylates, salixarates.

Dispersants include N-substituted long chain alkenyl succinimide as well as posted treated version thereof, post-treated dispersants include those by reaction with urea, thiourea, dimercaptothiadiazoles, carbon disulfide, aldehydes, ketones, carboxylic acids, hydrocarbon-substituted succinic anhydrides, nitriles, epoxides, boron compounds, and phosphorus compounds.

Antiwear agents include: metal thiophosphates, especially zinc dialkyldithiophosphates; phosphoric acid esters or salt thereof; phosphites; and phosphorus-containing carboxylic esters, ethers, and amides.

Anti-scuffing agents include: organic sulfides and polysulfides, such as, benzyldisulfide, bis-(chlorobenzyl) disulfide, dibutyl tetrasulfide, di-tertiary butyl polysulfide, di-tert-butylsulfide, sulfurized Diels-Alder adducts or alkyl sulfenyl N'N-dialkyl dithiocarbamates.

Extreme Pressure (EP) agents include: chlorinated wax; organic sulfides and polysulfides, such as, benzyldisulfide, bis-(chlorobenzyl) disulfide, dibutyl tetrasulfide, sulfurized methyl ester of oleic acid, sulfurized alkylphenol, sulfurized dipentene, sulfurized terpene, and sulfurized Diels-Alder adducts; phosphosulfurized hydrocarbons; and metal thiocarbamates, such as, zinc dioctyldithiocarbamate.

Friction modifiers include: fatty amines; esters, such as, borated glycerol esters; partial esters of glycerol, such as, glycerol monooleate; fatty phosphites; fatty acid amides; fatty epoxides; borated fatty epoxides; alkoxylated fatty amines; borated alkoxylated fatty amines; metal salts of fatty acids; fatty imidazolines; condensation products of carboxylic acids and polyalkylenepolyamines; and amine salts of alkylphosphoric acids.

Viscosity modifiers include: hydrogenated copolymers of styrenebutadiene, ethylene-propylene polymers, polyisobutenes, hydrogenated styreneisoprene polymers, hydrogenated isoprene polymers, polymethacrylate acid esters, polyacrylate acid esters, polyalkyl styrenes, alkenyl aryl conjugated diene copolymers, polyolefins, polyalkylmethacrylates and esters of maleic anhydride-styrene copolymers.

Dispersant viscosity modifiers (often referred to as DVM) include: functionalized polyolefins, for example, ethylene-propylene copolymers that have been functionalized with the reaction product of maleic anhydride and an amine; a polymethacrylate functionalized with an amine; and styrene-maleic anhydride copolymers reacted with an amine.

Corrosion inhibitors include: octylamine octanoate; condensation products of dodecenyl succinic acid or anhydride and a fatty acid, such as, oleic acid with a polyamine.

Metal deactivators include: derivatives of dimercaptothiodiazole, 1,2,4-triazoles, benzimidazoles, 2-alkyldithiobenzimidazoles or 2-alkyldithiobenzothiazoles.

Foam inhibitors include copolymers of ethyl acrylate and 2-ethylhexylacrylate and optionally vinyl acetate.

Demulsifiers include polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides.

Seal swell agents include Exxon Necton-37™ (FN 1380) and Exxon Mineral Seal Oil.

INDUSTRIAL APPLICATION

In one embodiment, the present invention is useful as a liquid fuel for an internal combustion engine. The internal combustion engine includes spark ignition and compression ignition engines; 2-stroke or 4-stroke cycles; liquid fuel supplied via direct injection, indirect injection, port injection and carburetor; common rail and unit injector systems; light (e.g. passenger car) and heavy duty (e.g. commercial truck) engines; and engines fuelled with hydrocarbon and non-hydrocarbon fuels and mixtures thereof. The engines may be part of integrated emissions systems incorporating such elements as; EGR systems; aftertreatment including three-way catalyst, oxidation catalyst, NOx absorbers and catalysts, catalyzed and non-catalyzed particulate traps optionally employing fuel-borne catalyst; variable valve timing; and injection timing and rate shaping.

In another embodiment, the present invention is useful in coatings, inks, millbases, plastics and paints, especially high solids paints; inks, especially offset, gravure and screen inks, radiation curable inks; non-aqueous ceramic processes, especially tape-coating, doctor-blade, extrusion and injection moulding type processes; composites, cosmetics, adhesives and plastics materials. Additionally, the composition of the present invention is an effective dispersant for uniformly distributing a particulate solid in an organic medium. Examples of suitable particulate solids are pigments for solvent inks; pigments, extenders and fillers for paints and plastics materials; disperse dyes; optical brightening agents and textile auxiliaries for solvent dyebaths, inks and other solvent application systems; solids for oil-based and inverse-emulsion drilling muds; dirt and solid particles in dry cleaning fluids; particulate ceramic materials; magnetic materials and magnetic recording media; fibres such as glass, steel, carbon and boron for composite materials; and biocides, agrochemicals and pharmaceuticals which are applied as dispersions in organic media.

In one embodiment, the invention provides a composition comprising (i) a particulate solid; (ii) an organic medium; and (iii) a quaternary ammonium salt which comprises the reaction product of:

a. Mannich reaction product having a tertiary amino group, said Mannich reaction product being prepared from the reaction of a hydrocarbyl-substituted phenol, an aldehyde, and an amine; and b. quaternizing agent suitable for converting the tertiary amino group to a quaternary nitrogen.

In one embodiment, the organic medium is an organic liquid or a plastics material.

In one embodiment, the composition as claimed in claim 1 wherein the organic liquid comprises at least 0.1% by weight of a polar organic liquid based on the total organic liquid.

In one embodiment, the particulate solid is a pigment.

In one embodiment, the invention provides a paint or ink composition comprising a particulate solid, an organic liquid, a binder and a quaternary ammonium salt which comprises the reaction product of:

a. Mannich reaction product having a tertiary amino group, said Mannich reaction product being prepared from the reaction of a hydrocarbyl-substituted phenol, an aldehyde, and an amine; and b. quaternizing agent suitable for converting the tertiary amino group to a quaternary nitrogen.

The binder is a polymeric material capable of binding the composition on volatilisation of the organic liquid. Binders are polymeric materials including natural and synthetic materials. In one embodiment, binders include poly(meth)acrylates, polystyrenics, polyesters, polyurethanes, alkyds, polysaccharides such as cellulose, and natural proteins such as casein. In one embodiment, the binder can be present in the composition at more than 100% based on the amount of particulate solid, more than 200%, more than 300% or more than 400%.

In one embodiment, the invention provides a mill-base comprising a particulate solid, an organic liquid and a quaternary ammonium salt which comprises the reaction product of:

a. Mannich reaction product having a tertiary amino group, said Mannich reaction product being prepared from the reaction of a hydrocarbyl-substituted phenol, an aldehyde, and an amine; and b. quaternizing agent suitable for converting the tertiary amino group to a quaternary nitrogen.

In one embodiment, the solid is an organic pigment from any of the recognised classes of pigments described, for example, in the Third Edition of the Colour Index (1971) and subsequent revisions of, and supplements thereto, under the chapter headed "Pigments". Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones and carbon blacks.

Inorganic solids include: extenders and fillers, such as, talc, kaolin, silica, barytes and chalk; particulate ceramic materials, such as, alumina, silica, zirconia, titania, silicon nitride, boron nitride, silicon carbide, boron carbide, mixed silicon-aluminium nitrides and metal titanates; particulate magnetic materials, such as, the magnetic oxides of transition metals, especially iron and chromium, e.g. gamma-$Fe_2O_3$, $Fe_3O_4$, cobalt-doped iron oxides, calcium oxide, ferrites, especially barium ferrites; and metal particles, especially metallic iron, nickel, cobalt, copper and alloys thereof.

In one embodiment, the organic medium, which can be present with the composition of the reaction product of the invention and particulate solid, is a plastics material. In another embodiment the organic medium can be an organic liquid. The organic liquid may be a non-polar or a polar organic liquid. In one embodiment, non-polar organic liquids are compounds containing aliphatic groups, aromatic groups or mixtures thereof. The non-polar organic liquids include non-halogenated aromatic hydrocarbons (e.g. toluene and xylene), halogenated aromatic hydrocarbons (e.g. chlorobenzene, dichlorobenzene, chlorotoluene), non-halogenated aliphatic hydrocarbons (e.g. linear and branched aliphatic hydrocarbons containing six or more carbon atoms both fully and partially saturated), halogenated aliphatic hydrocarbons (e.g. dichloromethane, carbon tetrachloride, chloroform, trichloroethane) and natural non-polar organics (e.g. vegetable oil, sunflower oil, linseed oil, terpenes and glycerides). In one embodiment, thermoplastic resins include: polyolefins, polyesters, polyamides, polycarbonates, polyurethanes, polystyrenics, poly(meth)acrylates, celluloses and cellulose derivatives. The compositions may be prepared in a number of ways but melt mixing and dry solid blending are typical methods. If desired, the compositions may contain other ingredients, for example, resins (where these do not already constitute the organic medium), binders, fluidizing agents anti-sedimentation agents, plasticisers, surfactants, antifoamers, rheology modifiers, leveling agents, gloss modifiers and preservatives.

A dispersion may be prepared by any of the conventional methods known for preparing dispersions. Thus, the particulate solid, the organic medium, and the dispersant may be mixed in any order, the mixture then being subjected to a mechanical treatment to reduce the particles of the solid to an appropriate size, for example, by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the composition.

The composition of the present invention is particularly suited to liquid dispersions. In one embodiment, such dispersion compositions comprise:
(a) from 0.5 to 70 parts of a particulate solid;
(b) from 0.5 to 30 parts of a compound of the quaternary ammonium salt described above; and
(c) from 20 to 99 parts of an organic liquid; wherein all parts are by weight and the amounts (a)+(b)+(c)=100.
and such dispersions are useful as (liquid) inks, paints, and mill-bases.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy); hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

The invention will be further illustrated by the following examples, which sets forth particularly advantageous embodiments. While the examples are provided to illustrate the present invention, they are not intended to limit it.

The detergents of the present invention are evaluated in the modified ASTM D5500 Driving Cycle Test. The vehicles used in this test are BMW™ 318i automobiles with 1.8 L 4 cycle engines. The fuel is a regular unleaded subgrade 85 octane blended with 10% ethanol. A polyether based fluidizer is included in the compositions. The intake valves are BMW™ intake valve model number 11-34-1-254-625.

The detergents that are used in this test include: a commercial available mannich reaction product of a 1000 Mn polyisobutylene phenol, formaldehyde and, dimethylamine (Comparative Example 1), and the experimental detergent of the present invention (Example 1) as described below.

Preparatory Example A

Preparatory Example A is prepared from a mixture of alkylated phenol prepared from 1000 Mn polyisobutylene (800 grams) and diluent oil—SO-44 (240 grams) nitrogen is applied and the mixture is stirred at 100 rpm. To this mixture, Formalin (55.9 grams) is added (dropwise) over 50 minutes. After which, dimethylamine (73.3 grams) is added (dropwise) over the next 50 minutes. The entire mixture is heated to 68° C. and held at 68° C. for one hour. After one hour, the mixture is heated to 106° C. and held for a further 2 hours. The temperature of the mixture is increased to 130° C. and held for 30 minutes before cooling overnight. The mixture is purified by vacuum distillation (130° C., −0.9 bar) to remove any remaining water. The resulting compound is a DMA Mannich.

Example 1

Reaction product of Preparatory Example A (1700 grams), styrene oxide (263 grams), acetic acid (66 grams) and methanol (4564 grams) are heated with stirring to reflux (~75° C.) for 6.5 hours under a nitrogen atmosphere. The reaction is purified by distillation (30° C., −0.8 bar). The resulting compound is a styrene oxide quaternary ammonium salt.

Note: For Comparative Example 1 the active chemical is accompanied by inert diluent oil in a ratio of active chemical to diluent oil of about 75:25 by weight.

Note: For Examples 1 the active chemical is accompanied by inert diluent oil in a ratio of active chemical to diluent oil of about 75:25 by weight.

TABLE 1

Results in the ASTM D550 Driving Cycle Test

| Detergent | Dose Rate Active (PTB) | mg/valve |
| --- | --- | --- |
| Comparative Example 1 | 12.5 | 55.0 |
| Comparative Example 1 | 12.5 | 84.0 |
| Comparative Example 1 | 25.0 | 18.7 |
| Example 1 | 12.5 | 5.0 |
| Example 1 | 12.5 | 48.0 |
| Example 1 | 8.4 | 64.0 |

The results of the test show that formulations using quaternary ammonium salt detergents of the present invention (Example 1) show equivalent or superior reduction in deposit formation of an intake valve injector compared to a commercially available detergent (Comparative Examples 1).

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

What we claim:

1. A composition comprising a quaternary ammonium salt which comprises the reaction product of:
   a. Mannich reaction product having a tertiary amino group, said Mannich reaction product being prepared from the reaction of a hydrocarbyl-substituted phenol, an aldehyde, and an amine; and
   b. quaternizing agent suitable for converting the tertiary amino group to a quaternary nitrogen wherein the quaternizing agent comprises hydrocarbyl substituted carbonates, hydrocarbyl epoxides in combination with an acid, or mixtures thereof.

2. The composition of claim 1, wherein the hydrocarbyl substituent of the hydrocarbyl-substituted phenol of component (a) is a polyolefin having a number average molecular weight of 400 to 3,000.

3. The composition of claim 1, wherein the aldehyde of component (a) is a formaldehyde or a reactive equivalent thereof.

4. The composition of claim 1, wherein the amine of component (a) is selected from the group consisting of dimethylamine, ethylenediamine, dimethylamino-propylamine, diethylenetriamine, dibutylamine, and mixtures thereof.

5. The composition of claim 1, wherein the amine compound of (a) is dimethylamine.

6. The composition of claim 1, further comprising a fuel which is liquid at room temperature.

7. The composition of claim 1, further comprising a fluidizer.

8. The composition of claim 1, further comprising an oil of lubricating viscosity.

9. The composition of claim 8, further comprising component selected from the group consisting of metal deactivators, detergents other than those of claim 1, dispersants, viscosity modifiers, friction modifiers, dispersant viscosity modifiers, extreme pressure agents, antiwear agents, antioxidants, corrosion inhibitors, foam inhibitors, demulsifiers, pour point depressants, seal swelling agents, wax control polymers, scale inhibitors, gas-hydrate inhibitors and mixtures thereof.

10. The composition of claim 9, wherein the component is an overbased metal containing detergent, zinc dialkyldithiophosphates or mixtures thereof.

* * * * *